United States Patent [19]

Baker

[11] 3,828,435

[45] Aug. 13, 1974

[54] GEOLOGICAL MOVEMENT DETECTORS
[75] Inventor: Donald O. Baker, Columbus, Ohio
[73] Assignee: Linear Devices Inc., Columbus, Ohio
[22] Filed: Dec. 20, 1971
[21] Appl. No.: 209,531

[52] U.S. Cl. ................................ 33/1 H, 33/125 B
[51] Int. Cl. ............................................. G01b 7/00
[58] Field of Search .. 33/1 H, 125 B, 147 N, 143 E; 340/421

[56] References Cited
UNITED STATES PATENTS

| | | | |
|---|---|---|---|
| 3,233,328 | 2/1966 | Schooley, Jr. | 33/143 L |
| 3,380,167 | 4/1968 | Abel et al. | 33/125 B |
| 3,404,460 | 10/1968 | Livingston et al. | 33/1 H |
| 3,460,258 | 8/1969 | Geary et al. | 33/1 H |
| 3,538,608 | 11/1970 | Bronson | 33/1 H |
| 3,594,773 | 7/1971 | Conkle | 340/421 |
| 3,646,553 | 2/1972 | Conkle | 33/1 H |

Primary Examiner—William D. Martin, Jr.

[57] ABSTRACT

A device for determining very minute movement, as well as relatively large movement, of a material such as rock in a mine. An anchor is secured to one part of the material, and another anchor is secured to a separated part of the material. A pair of movable elements are secured separately to the two anchors. One part of a transducer, as for example, in one embodiment, illustrated a carbon resistance bar of a variable resistance, is secured to one of the movable elements; and another part of the transducer, as for example in the same embodiment the wiper arm of the variable resistance, is secured to the other movable element. Thus, when one anchor moves relative to the other anchor, the resistance is varied. This is one type of linear transducer. In other types shown, an inductance or a capacitance is substituted for the variable resistance.

There is also provided an electrical circuit including a source or supply of electric power, the transducer, and a read-out device. The read-out device is shown herein as an ammeter.

1 Claim, 9 Drawing Figures

INVENTORS
DONALD O. BAKER
JAMES C. BUTTS

BY

*Jerome R. Cox*
ATTORNEY

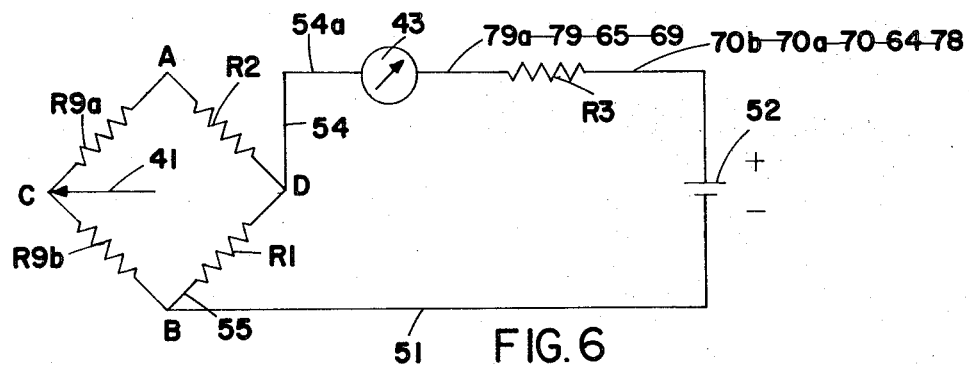
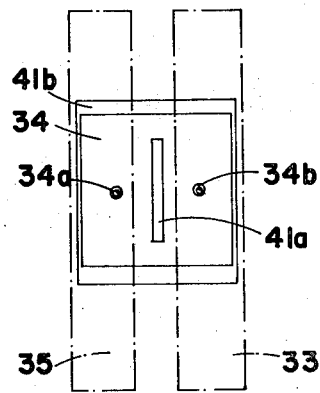
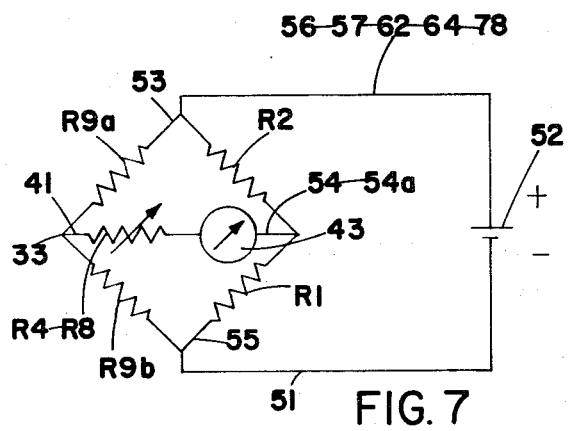
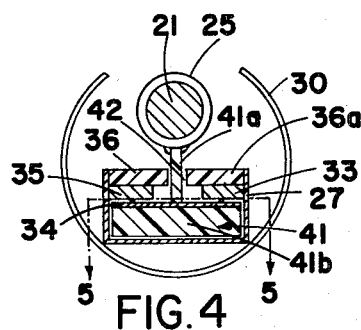
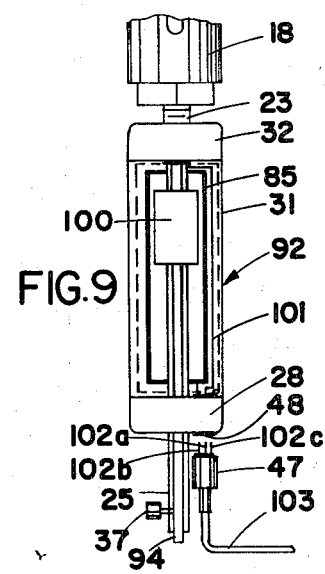
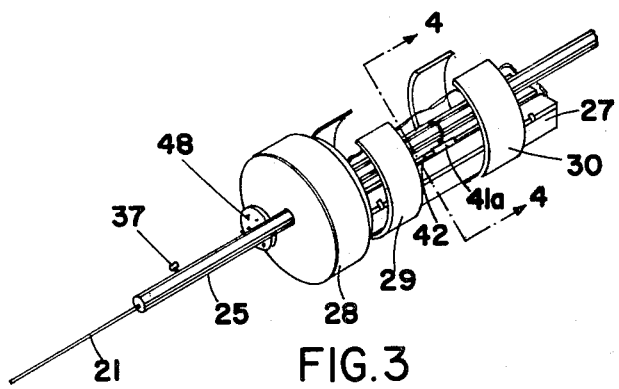

GEOLOGICAL MOVEMENT DETECTORS

BACKGROUND OF THE INVENTION

Heretofore devices have been provided for measuring earth movement, as for instance as is shown in Cumming U.S. Pat. No. 3,133,468, Anderson U.S. Pat. No. 3,286,514, and Livingston U.S. Pat. No. 3,404,460.

However, the device which I disclose herein is a relatively low cost unit designed to provide the mining engineer or geologist with a capability to perform a wide range of tests involving rock movement within the ceiling, column, or floor of a mine. It is an easy instrument to operate and offers great ease of installation. It will give the engineer or geologist a wide range of measurements including movement of from 1 inch (1"), or even more, down to 1/1000 of an inch (0.001"). The linear transducer unit is capable of detecting vertical movement whether downward or upward; and also, if desired, horizontal movement. Its anchors mount preferably in a standard roof pinning bolt hole of 1⅜ inch, or if desired in larger or smaller bolt holes, the recommended depth of the holes being 3', 6' and 9'. The linear transducer unit is used in conjunction with a linear read-out device. The read-out unit also offers rugged construction and excellent portability. A plurality of linear transducers are usually installed in one mine and it is possible to test any one of these, or even transducers in a different mine, by the use of a single portable read-out which may be taken from one transducer to another.

In devices previously used and as disclosed in the above patents, usually each measurement device has its own read-out portion so that it is necessary to have an indicator for each movement measuring element. Also, in most of the prior art devices, it is impossible to read movements of relatively great distances and with the same device read movements of very small distances. There is, therefore, need of a system which is economical and convenient to use and is capable of determining very minute movements as well as relatively large movement of material such as rock in a mine.

SUMMARY OF THE INVENTION

The device of the invention for determining movement of material, such as rock in a mine, uses a plurality of in-place combinations consisting of two elements movable relative to each other, one of which is connected to one part of the material and the other of which is secured to a different part of the material. Secured to one of these elements is one part of a transducer and secured to the other is another part of the transducer. The transducer may be an inductance or may be a capacitance or may be a variable resistance or rheostat. Thus, in one embodiment shown and described, a resistance bar (i.e. a carbon bar, or coils, etc.) of a variable resistance or rheostat is secured mechanically to one of the movable elements. Secured to the other movable element in this embodiment is the wiper arm of the rheostat which thus is movable relative to the bar or coils so that resistance through the rheostat may be varied. In this first embodiment described, the bar or coils of the rheostat and the wiper arm are electrically connected in an electrical circuit which includes also a source of electrical power and a read-out device. Also included in the circuit when in operative condition is any selected one of a plurality of fixed resistances and a switch by which the circuit may be caused to include any one of said plurality of fixed resistances. The read-out device includes an ammeter by which the current flowing through the circuit may be read.

Actually, the read-out device casing (which is portable from one fixed installation to another) includes in this embodiment not only the ammeter but also the several fixed resistances and the switch which may be moved to include any one of the fixed resistances. The switch may also be moved to a neutral position for the purpose of giving a voltage check or to an "off" position where there is no completed electrical circuit and no current can flow through the device. The switch for making these changes is also included in the read-out device casing. This is for the purpose of convenience and there is no necessity that the switch and the fixed resistances be associated with the read-out device inasmuch as they could be included in the in-place installation along with the anchors, the rods, the sleeve, the coils or bar of the rheostat, and the wiper of the rheostat.

By means of the possibility of including any one of a plurality of different resistances in the circuit (as for example resistances 470K, 100K, 50K, or 25K) I am enabled to measure either very small distances or relatively large distances at my option.

It is therefore an object of the invention to provide an improved device for determining movement of materials.

Another object of the invention is to provide a device for determining movements, which device will not only determine very minute movements but also will determine relatively large movements.

A further object of the device is the provision in connection with such a device of a linear transducer in which a movable part thereof is connected to one relatively movable element installed in-place in one part of the material and another movable part of the linear transducer is connected to another separate movable element installed in-place in another part of the material.

Another object of the invention is the combination in connection with a device of the character described in which one part of a linear transducer is connected electrically to an ammeter to which another relatively movable part of the linear tranducer is also electrically connected.

A further object of the invention is the provision of a device for measuring movement of materials, such as rock, in which there is a plurality of in-place installations in the material and in which there is a separable read-out casing consisting of an ammeter and other elements of an electrical circuit wherein the read-out casing can be operably connected electrically with any one of such in-place installations.

Further objects and features of the invention will be apparent from the following specification and claims when considered in connection with the accompanying drawings illustrating an embodiment of the invention.

DESCRIPTION OF THE DRAWINGS

FIG. 3 is a fragmentary view in perspective of the variable resistance or rheostat device of this embodiment of our invention, a portion of its casing being removed, but showing the rod and sleeve connected to the wiper arm of the rheostat;

FIG. 4 is a view in section taken substantially along line 4—4 of FIG. 3;

FIG. 5 is a view in section taken substantially along line 5—5 of FIG. 4;

FIG. 6 is an electrical diagram similar to a portion of FIG. 2 illustrating the wheatstone bridge principle involved obtaining a voltage check;

FIG. 7 is a schematic similar to FIG. 6 showing a portion of the electrical connections of FIG. 2 in which the switch has been moved so as to determine the amount of movement between the anchors installed in place in the material.

FIG. 9 is a fragmentary view of a portion of a transducer in which a variable capacitance is used in still another embodiment of the invention.

Figure 2:
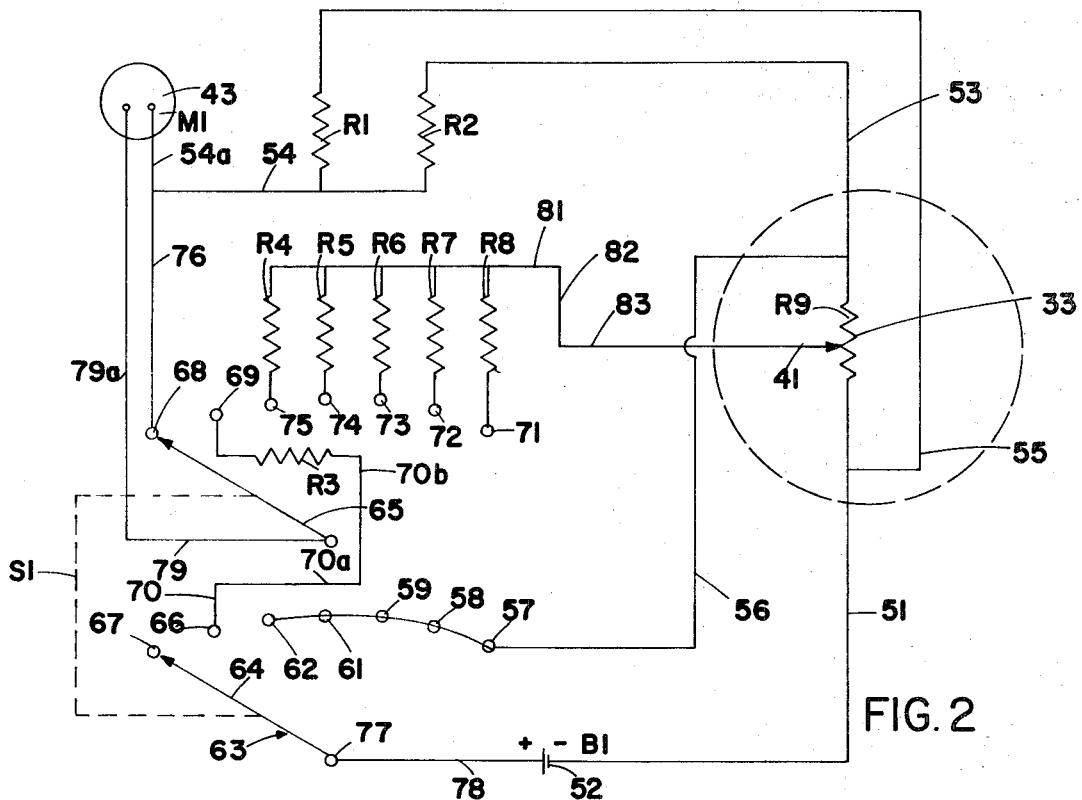
FIG. 2 is a schematic diagram of electrical circuits which are utilized in this embodiment of our invention.

In describing the preferred embodiments of the invention illustrated in the drawings, specific terminology will be resorted to for the sake of clarity. However, it is not intended to be limited to the specific terms so selected, and it is to be understood that each specific term includes technical equivalents which operate in a similar manner to accomplish a similar purpose. For example, the device of the first embodiment is described as having the fixed resistances and the switching elements included in the read-out device casing. However, it is clear that these elements could instead be incorporated, if desired, in the portion of the device which is permanently fixed in the mine.

DETAILED DESCRIPTION

Figure 1:
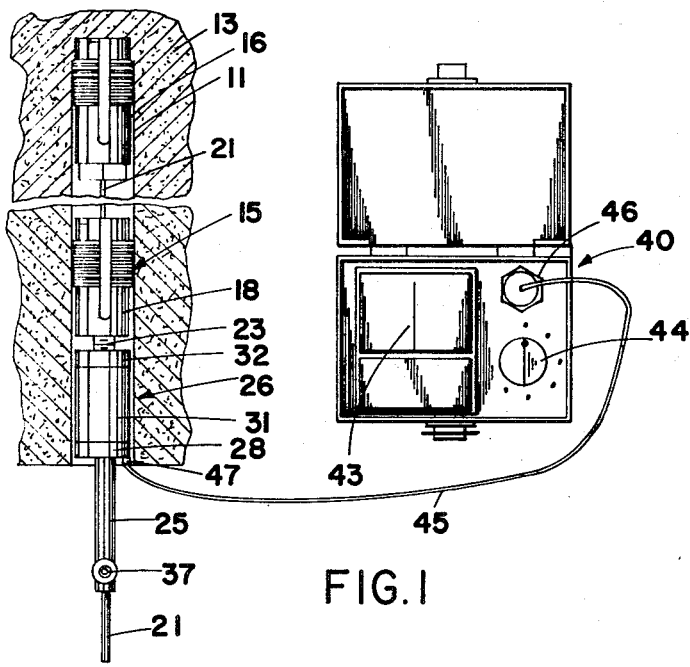
FIG. 1 is a view partly in side elevation and partly in section of respectively: (1) the in-place installation elements of a measuring device which is one embodiment of our invention and which is shown as installed in a drill hole in a rock formation, the rock formation being shown in section; and (2) of the separate portable read-out casing of this embodiment, the in-place installation and the portable casing being shown connected by an electrical cable.

As stated above, FIG. 1 is a view mainly in side elevation of our device, the bore hole 11 extending into a rock mass 13 shown in longitudinal section, the in-place apparatus 15 which is constructed in accordance with the principle of this invention being mounted in the bore hole. A read-out device casing 40 is shown connected to apparatus 15 by an electrical cable.

Referring more particularly to FIG. 1 of the drawings, there is shown the bore hole 11 which has been drilled into a rock mass 13 and in which there is inserted the in-place elements 15 of the linear transducer device constructed according to one embodiment of my invention. The in-place installation portion of the apparatus 15 includes an inner anchor 16 secured in one part of the rock, an outer anchor 18 secured in a different portion of the rock, and a transducer unit 26 of which the outer casing is designated 31. Secured to the anchor 16 is a rod 21, and secured to the outer anchor 18 by threads 23 is the casing 31. The casing 31 is provided with a variable electrical resistance or rheostat which may include a carbon bar or a resistance strip 33 (see FIGS. 3 and 4). The bar 33, as will be more apparent later, is connected at opposite ends to electrical leads forming a part of the electrical circuit by which the distance between the anchors 16 and 18 is accurately measured. The rod 21 passes through a sleeve 25 and is secured to the sleeve 25 in any desired position (as may be required by the distance between the anchors 16 and 18 in the bore 11 in the rock material) by means of a set screw 37. After the set screw is tightened, the rod 21 and the sleeve 25 are in effect unitary, and if moved, move as a unit. The sleeve 25 and the rod 21 as a unit pass through the casing 31 and into, and in some instances through and beyond, the anchor 18 to which the casing 31 is secured by threads such as by the externally screw threaded stud 23.

The sleeve 25 carries a T-shaped unit 41 which forms the wiper arm of the variable resistance or rheostat. The unit 41 moves along the length of the resistance bar 33. The unit 41 is mainly of plastic which is a non-conductor of electricity and includes an upright plastic portion (as shown in FIG. 4) 41a and its lower end is integral with a relatively thick plastic laterally extending portion 41b, also a non-conductor of electricity. However, mounted on the portion 41b is an electricity conducting metal plate or strip 34. This metal plate or strip 34 makes an electrical connection at all times with the resistance strip 33 and with a longitudinally extending electricity conducting metal strip 35 by means of metal contact wipers 34a and 34b. The conductor 35 provides a fixed terminal electrically connected to moving metal strip 34. Insulation is provided as at 36 and 36a which portions may be integral and with a slot 42 provided for passage of T-shaped unit portion 41a, if desired. The T-shaped wiper arm 41 is thus mechanically but not electrically connected to the sleeve 25 and is designed to move the metal strip 34 over the surface of the resistance 33 and over the longitudinally extending strip 35. The resistance 33 may be a carbon resistance as shown or it may be a coil of a rheostat. All of the above is shown partially in FIG. 1 but more clearly in FIGS. 3, 4 and 5.

The metal contact wipers or clips 34a and 34b are firmly secured to the metal plate 34 at all times and move with the plate 34 whenever it is moved by the T-shaped unit 41. The carbon resistance is electrically connected at its opposite ends to leads 51 and 53 (see FIG. 2) and the metal strip 35 is electrically connected to lead 83. The leads 51, 53, and 83 are enclosed in a cable 45.

The transducer unit 26 includes an inner casing 27, the outer casing 31, an inner cap 32 having the externally screw threaded stud 23, an outer cap 28, and a pair of spring supports 29 and 30. The outer casing 31 embraces the supports 29 and 30 and is guided thereby, and is secured at one end to the inner cap 32 and at the other end to the outer cap 28. As stated above, the inner cap 32 carries the screw threaded stud 23 whereby transducer unit 26 including the casing 31 and the anchor 18 are effectively unitary and, if moved, move as a unit. As shown in FIGS. 3 and 4, the upright portions 41a of the T-shaped wiper arm 41 moves in a slot 42 formed between the insulation strips 36 and 36a.

Also shown in FIG. 1 is the portable read-out device casing 40 which consists of a casing having various electrical elements including an ammeter 43, a rotary switch 63 of which a knob 44 is shown in FIG. 1, and fixed resistances which together with switch 63 will be described more in detail in connection with FIGS. 2, 6 and 7. The electrical portion of the read-out device 40 is connected by a three-wire electrical cable 45 which is plugged into the read-out device 40 as at connector 46 and is also removably connected as at 47 to a socket 48 (shown in FIG. 3) of the unit 26. It carries the leads 51, 53, and 83 as described above.

Referring now to FIG. 2, it may be seen that one end of the resistance 33 is connected through lead 51 with battery 52 and the other end of resistance 33 is connected through lead 53 with resistance R2 and then through lead 54 with ammeter 43. Leads 51 and 53 are parts of conduit 45 as is also lead 83 later referred to. A lead 55 is connected to lead 51 intermediate the battery 52 and the resistance 33 and is connected to resistance R1 which is in turn connected to lead 54 intermediate resistance R2 and the ammeter 43. Lead 56 is connected to lead 53 intermediate the resistance 33 and the resistance R2, and at its opposite end is connected to the five contact points 57, 58, 59, 61 and 62 of a gang switch designated generally as 63. The gang switch 63 having control knob 44 has two movable arms 64 and 65, the arm 64 being adapted to contact with the fixed contacts 57, 58, 59, 61 and 62, and also with a fixed voltage test contact 66. It also may be moved to the "off" position 67. The movable arm 65 moves with the movable arm 64 and when the arm 64 contacts with the "off" position contact 67, the arm 65 is moved to the fixed contact 68. This shorts the ammeter 43 to prevent or minimize undesired activation thereof. When the contact arm 64 is moved to the contact 66, the arm 65 makes a connection with the fixed contact 69. When the movable arm 64 is moved to the fixed contacts 57, 58, 59, 61 and 62, respectively, the movable arm 65 is moved to the fixed contacts 71, 72, 73, 74 and 75 respectively. The contact point 68 is connected through a lead 76 and a lead 54a to ammeter 43. The axis point 77 of movable arm 64 is connected to the battery 52 by means of a lead 78. The axis point of the movable arm 65 is connected through leads 79 and 79a with the ammeter 43. Resistors R4, R5, R6, R7 and R8 are connected respectively to the fixed contact points 75, 74, 73, 72 and 71 and are connected in series through leads 81, 82, and 83 with wiper arm 41.

The resistances R4, R5, R6, R7 and R8 may be fixed resistances but are preferably variable resistances. For example, we have used variable resistances such as R4 having a maximum of 100 ohms, R5 having a maximum of 50 ohms, R6 having a maximum of 50 ohms, R7 having a maximum of 25 ohms, and R8 having a maximum of 25 ohms. We can then set the resistances so that each has a different resistance. For example, only, we can have resistances of R4 to R8 respectively of 100 ohms, 45 ohms, 30 ohms, 20 ohms and 10 ohms. Thus in any particular system we may have a plurality of resistances which vary and have values considered most appropriate for the system.

FIG. 6 shows the voltage check position diagrammed in conventional wheatstone bridge form. Therein is shown diagrammatically the resistances R9a and R9b of resistance 33, the wiper arm 41, the ammeter 43, the fixed resistances R1 and R2, the battery 52 and the various leads by which these elements are connected. The letters A, B, C and D indicate the four points of the wheatstone bridge. FIG. 7 shows a diagram similar to FIG. 6 for the operation of the electrical circuit passing through one of the resistances R4 – R8 inclusive, as well as through the variable resistance 33 (R9a – R9b) and ammeter 43.

OPERATION

The structure is assembled as described above with the rod 21 secured to the anchor 16 and the casing 31 secured to the outer anchor 18. The bridge of FIG. 7 is then balanced manually so that zero current is indicated on the ammeter 43. That is to say, with the rod 21 secured to the anchor 16, the sleeve 25 is moved manually thus moving the wiper arm over the carbon resistance 33 until the ammeter 43 shows zero current and the bridge is nulled. This is preferably accomplished by first switching them to the resistance R4 to R8 inclusive) having the largest resistance, then balancing and then switching to smaller resistance until the bridge is balanced for the smallest resistance. This practice will protect the ammeter. After balance is obtained, the set screw 37 is tightened so that any subsequent movement of the rod 21 relative to the casing 26 will unbalance the bridge. In the balanced condition $$R9^a/R9^b : R2/R1$$

We prefer to use a 1K ohm variable resistance 33 with $R1 = R2 = 500$ ohms.

Any movement of the anchor 16 relative to the anchor 18 or vice versa now causes a movement of the arm 41 along the resistance 33 thus causing a bridge imbalance $$R9^a/R9^b \neq R2/R1$$

This imbalance causes current to flow through the ammeter 43. The magnitude of the imbalance and thus the meter reading is directly proportional to the movement of the indicator on the scale of the ammeter 43. The ammeter is calibrated for distance change for each particular resistance R4, R5, R6, R7 and R8 which the operator has optioned to use, so that the anchor movement can be accurately determined regardless of whether it is a larger movement or a minute movement.

The knob 44 is first turned to the largest resistances R4 – R8 and then sequentially to smaller ones until any significant deflection is observed. The smallest resistance will of course be for the most sensitive scale. Having determined that there is or is not any serious movement of rock at the point tested, the read-out device 40, possibly together with the cable 45, may then be disconnected, moved to another location at a different in-place device, the reading of the movement at that point can also be determined, and thus many locations can be checked one after another. We prefer however, to leave the cable with the transducer and move only the read-out device 40.

Figure 8:
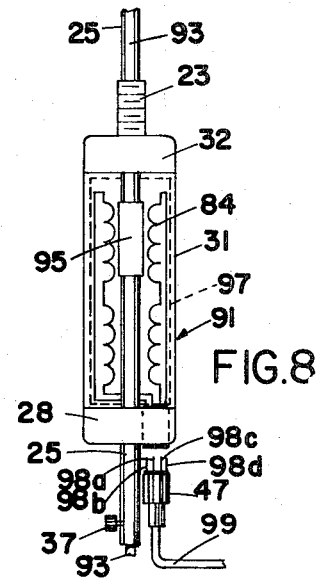
FIG. 8 is a fragmentary view of a portion of a transducer in which a variable inductance is utilized in another embodiment of the invention.

As shown in FIGS. 8 and 9 respectively, an inductance coil 91 or a capacitance 92 may be substituted for resistance 33. Relatively movable rods 93 or 94 correspond to rod 21, and may be moved through the coil 84 or capacitance 85 respectively to vary the flow of current therethrough, it being understood that the inductance coil 91 (or capacitance 92) is connected to one anchor 16 or 18 and the rod 93 (or rod 94) is itself connected to the other anchor and that an A.C. source will be used instead of a battery such as 52.

In FIG. 8, rod 93 corresponds to rod 21 of FIGS. 1 - 6 and may be designated the control rod. Sleeve 25 corresponds to sleeve 25 of FIGS. 1 - 6 and may be designated as a calibration rod. Housing 31 corresponds to transducer housing 31 of FIGS. 1 - 6. Ferrite core 95 may be moved by sleeve 25 relative to coil 84 and transformer 97 responsive to relative movement of anchors 16 and 18 to vary current in leads 98a, 98b, 98c and 98d thus controlling the showing of ammeter 43. These leads are all housed in cable 99. Cable 99 corresponds to cable 45 and is in turn connected to read-out device 40.

In FIG. 9 rod 94 corresponds to rod 21 of FIGS. 1 - 6 and may be designated the control rod. Sleeve 25 corresponds to sleeve 25 of FIGS. 1 - 6 and may be designated a calibration rod. Housing 31 corresponds to transducer housing 31 of FIGS. 1 - 6. Slug 100 may be moved by sleeve 25 relative to stator 101 of the capacitance transducer responsive to relative movement of the anchors 16 and 18 to vary current in leads 102a, 102b and 102c. Leads 102a, 102b and 102c are housed in cable 103. Cable 103 corresponds to cable 45 and is connected to read-out device 40 and thus controls the showing of ammeter 43.

While the read-out device is shown and described merely as a meter (i.e. voltmeter of ammeter), it can be a digital read-out device or an oscillograph.

The source of electrical power supply may be a battery as indicated in the drawing or an electrical socket to which electrical current is supplied by a generator or any other similar source.

In connection with the inductance of FIG. 8 and the capacitance of FIG. 9 we prefer to use an A.C. oscillator (perhaps of 1,000 cycles) and a battery connected in the oscillator circuit and acting as a power source for the oscillator.

In FIG. 2 M1 stands for meter 1 and indicates ammeter 43; S1 stands for switch 1 and indicates switch 63; and B1 stands for battery 1 and indicates battery 52.

It is to be understood that while detailed drawings and specific embodiments are given, they are for the purpose of illustration only, that the apparatus of the invention is not limited to the precise details and conditions disclosed, and that various changes may be made therein without departing from the spirit of the invention which is defined by the following claims.

We claim:
1. A device for determining very minute movement as well as very large movement of a material such as rock in a mine comprising
   an anchor fixed to one part of the material;
   an anchor fixed to a separated part of the material;
   an elongated movable element secured to one of the anchors;
   a movable element secured to the other anchor;
   electrical transducer means having two relatively movable parts for controlling a current flow, one of said movable parts being connected to said elongated element and the other movable part being connected to the other movable element; and
   an electrical circuit means connected electrically to said electrical transducer means and including a source of electrical power, and a read-out device, said electrical transducer means controlling the amount of current flow through the read-out device
   in which the electrical means for controlling the amount of current flow is a variable resistance;
   in which there is provided a plurality of fixed resistances and an electrical switch by which at least any one of said fixed resistances may be included in said electrical circuit;
   in which the variable resistor is part of a wheatstone bridge and in which there are provided a plurality of additional resistors each having a different resistance, and a switch by which any one of said additional resistors may be connected in series with said variable resistance;
   in which the read-out device is an ammeter;
   in which one of the movable elements is a rod adjustably secured by means of a setscrew to a sleeve through which it passes and the sleeve is connected to one movable part of the electrical means for controlling the amount of current flow; and
   in which the rod is secured to a carbon resistance bar and the other movable element is secured to a wiper arm which is movable over the surface of the carbon resistance bar, the resistance bar and the wiper arm comprising the means for controlling the amount of current flow.

* * * * *

PO-1050
(5/69)

UNITED STATES PATENT OFFICE
CERTIFICATE OF CORRECTION

Patent No. 3,828,435      Dated  August 13, 1974

Inventor(s)  Donald O. Baker

It is certified that error appears in the above-identified patent and that said Letters Patent are hereby corrected as shown below:

column 1, line 31, should read --- read-out device which --- rather than "read-out which";

column 6, line 44, should read --- whether it is a large movement rather than "whether it is a larger movement"; and column 7, line 26 should read --- (i.e. voltmeter or ammeter)--- rather than "(i.e. voltmeter of ammeter)".

Signed and sealed this 19th day of November 1974.

(SEAL)
Attest:

McCOY M. GIBSON JR.
Attesting Officer

C. MARSHALL DANN
Commissioner of Patents